Jan. 29, 1946. R. E. SWANSON 2,393,837
DETACHABLE SWEAT BAND FOR EYEGLASSES
Filed Dec. 29, 1944

INVENTOR
Rudolph E. Swanson
BY Nathaniel Frucht
ATTORNEY

Patented Jan. 29, 1946

2,393,837

UNITED STATES PATENT OFFICE 2,393,837

DETACHABLE SWEATBAND FOR EYEGLASSES

Rudolph E. Swanson, Riverside, R. I., assignor to Inlaid Optical Corporation, a corporation of Rhode Island Application December 29, 1944, Serial No. 570,396

1 Claim. (Cl. 88—44)

The present invention relates to the manufacture of eye glasses, and has particular reference to the construction of a novel sweat band therefor.

The principal object of the invention is to provide a sweat band construction which may be detachably secured to an eye glass frame.

A further object of the invention is to provide a sweat band construction for eye glasses which may be made of any suitable material and of any desired color.

An additional object of the invention is to provide an eye glass sweat band which can be produced by a molding operation.

With the above and other objects and advantageous features in view, the invention consists of a novel arrangement of parts more fully disclosed in the detailed description following, in conjunction with the accompanying drawing, and more specifically defined in the appended claim.

Figure 1:
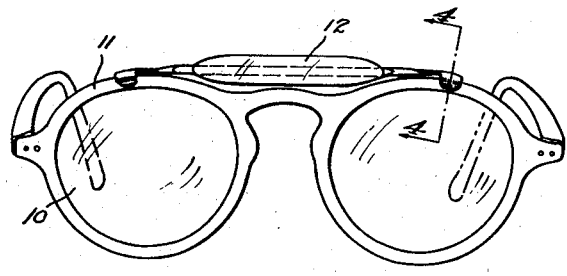
Fig. 1 is an elevation showing the novel sweat band mounted on a standard type molded eye glass frame.
Figure 2:
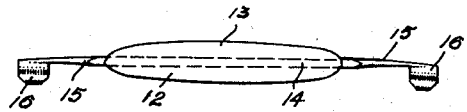
Fig. 2 is an elevation of the novel sweat band.
Figure 4:
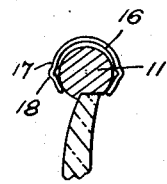
Fig. 4 is an enlarged sectional detail on the line 4—4 of Fig. 1.
Figure 3:
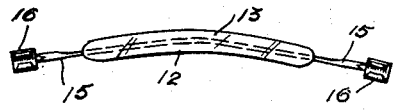
Fig. 3 is a bottom plan view thereof.
Figure 5:
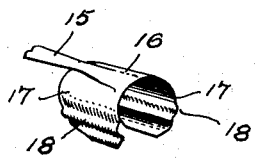
Fig. 5 is a perspective view of one end of the novel sweat band, showing the gripping finger thereof.

It has been found desirable to provide a sweat band construction which may be readily attached to any standard eye glass frame, whereby the sweat band may be sold complete with the eye glass frame, or may be sold separately to be attached to his own eye glass frame by the purchaser. This permits use of a sweat band of any desired color, so as to obtain a similar or a contrasting color effect when attached to an eye glass frame. Further, when it is not desired to have the sweat band attached, it may be readily removed. To this end, I have provided an attachable sweat band which utilizes a central portion integrally molded around a support rod, the ends of the rod extending laterally outwardly from the central portion and being provided with attaching fingers for releasably locking the sweat band to the rims of the eye glass frame.

Referring to the drawing, the eye glass 10 is provided with a frame 11 of standard construction, the illustrated frame being of the molded type, a sweat band 12 being releasably mounted on the frame, as illustrated. The novel sweat band 12 includes a central portion 13 which may be molded of any suitable plastic material such as phenol condensation products, Bakelite, resins, or the like, which is molded integrally about a metal support rod 14, the ends of the support rod extending laterally outwardly to provide two arms 15 which have gripping fingers 16. The fingers are preferably of tubular form with resilient sides 17 and are provided with longitudinal corrugations 18 if desired, for the purpose of snappingly engaging the upper portion of the eye glass frame.

With the above described construction, the sweat band may be of any suitable shape, color or material, and may be quickly locked in place on an eye glass frame and quickly removed, as desired. Although the preferred embodiment of the invention comprises a molded sweat band, it is obvious that a metal sweat band stamped out or otherwise suitably made may be used, which has two laterally extending arms provided with grips for releasable attachment to the upper portion of an eye glass frame.

While I have described a specific constructional embodiment of my invention, it is obvious that changes in the size and shape of the parts, in their relative positioning and attachment, and in their material and ornamentation, may be made to suit the requirements for different sweat band designs, without departing from the spirit and the scope of the invention as specified in the appended claim.

I claim:

A sweat band for an eye glass frame comprising a central portion of molded material adapted to be positioned over the nose piece of the frame, a metal rod imbedded in the central portion, and having two support arms extending laterally outwardly from the central portion, said support arms having gripping elements at their ends for detachable locking to the eye glass rims of the frame.

RUDOLPH E. SWANSON.